United States Patent

Tsuji et al.

[15] 3,705,272

[45] Dec. 5, 1972

[54] NOISE DIMINISHING SWITCHING CIRCUIT FOR MAGNETIC RECORDING-REPRODUCING DEVICE

[72] Inventors: Takao Tsuji; Minoru Yoshikawa, both of Kawasaki-shi, Japan

[73] Assignee: Canon Kabushiki Kaisha, Tokyo, Japan

[22] Filed: July 15, 1970

[21] Appl. No.: 55,115

[30] Foreign Application Priority Data

July 18, 1969 Japan ................................44/56805
Aug. 16, 1969 Japan ................................44/77416

[52] U.S. Cl. ..........................................179/100.2 K
[51] Int. Cl. ..............................................G11b 15/12
[58] Field of Search .................179/100.2 K, 100.2 D

[56] References Cited

UNITED STATES PATENTS 2,531,141 11/1950 Lootens........................179/100.2 D
2,596,621 5/1952 Van Loon et al.............179/100.2 D

*Primary Examiner*—Bernard Konick
*Assistant Examiner*—Robert S. Tupper
*Attorney*—Ward, McElhannon, Brooks & Fitzpatrick

[57] ABSTRACT

A magnetic recording-reproducing device comprises at least one switchable recording-reproducing head and at least one erase head. In a high-frequency bias recording system, high-frequency bias is applied to the recording-reproducing head in addition to the signals to be recorded on the magnetic recording medium. Also in a high-frequency erasing system, high-frequency erasing current is applied to the erase head. In both cases, in switching the operation modes of each head from one to the other and vice versa, the annoying noise is recorded on the recording medium because of the high-frequency current applied to the respective heads. In order to eliminate the noise, prior to mode switching of the heads, the high-frequency current is interrupted and thereafter high-frequency current is supplied to the heads.

10 Claims, 8 Drawing Figures

NOISE DIMINISHING SWITCHING CIRCUIT FOR MAGNETIC RECORDING-REPRODUCING DEVICE

This invention relates to a switching circuit for magnetic recording-reproducing devices and more particularly to a switching circuit of the type described which eliminates the noise produced when one operating mode is switched to the other operating mode.

When the signals are recorded on a magnetic recording medium by a magnetic recording-reproducing device, the high-frequency bias having a frequency several times higher than a frequency range of the signals to be recorded is superposed upon the latter so as to reduce the distortion. This is known as the high-frequency bias recording system. When the signals superposed with the high-frequency bias are interrupted by mode selection switches, exceedingly high noise is recorded on the magnetic recording medium when switched. For example, a recording-reproducing head which functions as a recording head as well as a reproducing head is used, the strong noise is recorded on the magnetic tape when the recording mode is switched to the reproducing mode. Therefore, the annoying sound is reproduced.

The so-called high frequency erasing method is employed in the magnetic recording-reproducing field so that the signals recorded on the magnetic tape or the like may be erased by the alternating magnetic fields produced by the high frequency signals fed to the erase head. However, when the erasing current is interrupted, the annoying noise is recorded on the magnetic tape.

The reason why such noise is recorded in either case is not clear, but it is assumed that when the recording mode is switched to the reproducing mode or when the erasing operation is interrupted, the distortion or asymmetry of the high frequency component is recorded on the magnetic tape as the strong residual magnetized sections which are reproduced as the noise. That is, in case of interrupting the high-frequency bias by the selection switches, the transient noise produced because of the non-uniform contact between the moving and fixed contacts of the selection switches is fed directly to an amplifier for recording or to a magnetic recording-reproducing head, superposed with the high-frequency bias and recorded on the tape as the residual magnetization. Therefore, the annoying sound is reproduced when the magnetic tape is reproduced.

In the latter case where the erasing current to the erase head is interrupted, the noise due to the asymmetry of the erasing magnetic fields is recorded on the magnetic tape unless the erasing current is interrupted when the alternating magnetic fields produced by the erasing current disappears. Therefore when the tape is reproduced, the annoying sound is reproduced.

One of the objects of the present invention is to eliminate the defects encountered in the conventional device and to eliminate the transient noise which tends to be recorded upon a magnetic tape when the signals to be recorded are interrupted in the presence of the high-frequency bias.

In a magnetic recording-reproducing device employing a high-frequency bias which is also used as the erasing current, the high frequency signals are interrupted prior to the switching from the recording mode to the reproducing mode or prior to the interruption of the erasing mode so that high-level noise may not be recorded on the magnetic tape or the like.

Another object of the present invention is to provide a mode switching circuit for magnetic recording-reproducing devices in which a member for actuating the selection switches which switches the recording mode to the reproducing mode and vice versa has a switch for actuating a delay circuit which interrupts the high-frequency bias and erasing current used in the magnetic recording-reproducing devices. The time the high frequency signals are interrupted is deviated from the time the selection switches are switched so that switching of the mode selection switches may be made in the absence of the high frequency signals, whereby the high-level noise due to the high-frequency signals may not be recorded upon the magnetic recording medium such as a magnetic tape or the like.

The present invention will become more apparent from the following description of the preferred embodiment thereof taken in conjunction with the accompanying drawing, in which.

Figure 1:
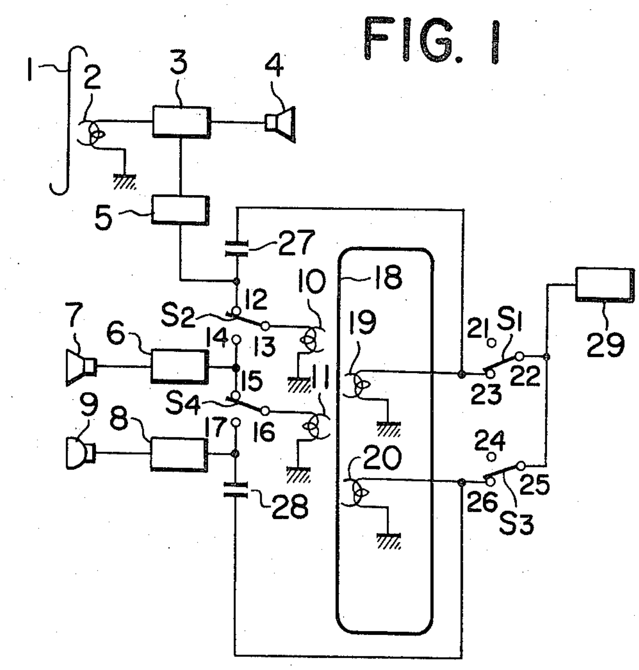
FIG. 1 is a block diagram depicting the conventional magnetic recording-reproducing device used for learning the languages.

Referring to FIG. 1, the foreign language pronunciation patterns are recorded upon a magnetic tape 1 and reproduced through a reproducing head 2, a reproduction power amplifier 3 and a loudspeaker 4. The signals branched from the power amplifier 3 are recorded upon an endless magnetic tape 18 by a magnetic recording-reproducing head 10 through an amplifier 5 and contacts 12 and 13 of a recording-reproducing mode selection switch S2, together with the high frequency bias fed from a high frequency bias generator 29 through contacts 22 and 23 of a recording-reproducing selection switch S1 and a capacitor 27.

Figure 2:
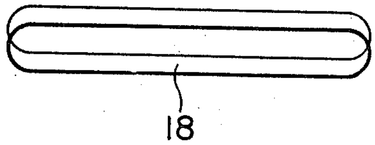
FIG. 2 is a perspective view for explanation of a magnetic tape used in this device.

The endless tape 18 is in the form of a loop as shown in FIG. 2 so that this tape recorded by the recording-reproducing head 10 comes back to the initial position after a predetermined time. Ahead of the recording-reproducing head 10 is located an erase head 19 to which is fed the erasing current from the high-frequency bias generator 29 through the contacts 22 and 23 of the selection switch S1 which coacts with the switch S2. Therefore, the previously recorded signals are erased before the new signals are recorded by the recording-reproducing head 10.

Figure 3:
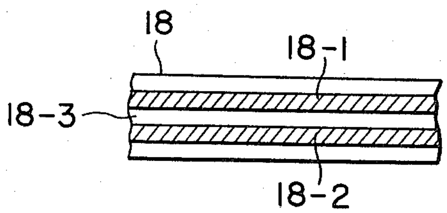
FIG. 3 is a representation for explanation of the tracks of the magnetic tape shown in FIG. 2.

The magnetic tape 18 has double tracks 18-1 and 18-2 between which lies a non-recording portion 18-3 as shown in FIG. 3. The magnetic head 10 records and reproduces the signals on the track 18-1 and the magnetic erase head 19 erases these signals. The magnetic recording-reproducing head 11 records and reproduces the signals on the track 18-2 and the magnetic erase head 20 erases these signals. When the track 18-1 is reproduced, the movable contact 13 of the selection switch S2 is switched to the contact 14 and the signals are reproduced through the head 10, the amplifier 6 and the loudspeaker 7. The signals from a microphone 9 are recorded in track 18-2 of the magnetic tape 18 through the magnetic recording-reproducing head 11 and amplifier 8 and through the contacts 17 and 16 of the selection switch S4 coacting with the switch S3, together with the high-frequency bias fed from the bias generator 29 through the contacts 25 and 26 of the selection switch S3 and a capacitor 28. The switch S1 cooperates with the switch S2 while the switches S3 and S4 cooperate. Therefore, recording and reproducing the signals in the tracks 18-1 and 18-2 may be independently.

When the magnetic tape 18 is in contact with the recording-reproducing heads 10 and 11 and the erase heads 19 and 20 and when the contact 16 is switched to the contact 17 in the switch S4 while the contact 25 is switched to the contact 26 in the switch S3, the contact 13 is switched to the contact 14 from the contact 12 in the switch S2 while the contact 22 is switched to the contact 21 from the contact 23 for recording the signals in the track 18-2. That is, when the track 18-1 is switched from recording to reproducing mode, there exists the timing relation between the switching operations of the switches S1 and S2. For example when the switch S2 functions faster than the switch S1, the noise produced when the contact 13 removes from the contact 12 or 14 (because of the non-uniform contact between the contacts) is recorded on the magnetic tape 18 as in the case of the ordinary recording process because of the presence of the high-frequency bias. Therefore, when the tape 18 which is switched from the recording to reproducing mode makes one revolution, the noise is reproduced through the recording-reproducing head 10, the amplifier 6 and the loudspeaker 7. The power applied to the erase head is generally greater than that fed to the recording-reproducing head so that the distortion or asymmetry of the erasing current due to the incomplete contact between the contacts when the contact 22 is switched to the contact 21 from the contact 23 in the switch S1 is recorded upon the tape as noise. From the foregoing, it is seen that the noise is recorded because the recording mode is switched to the reproducing mode in the presence of the high-frequency bias and erasing current. On the other hand when there is no high-frequency bias or erasing current, that is in case of zero bias, the recording response or sensitivity is very low as compared with the case of employing the high-frequency bias. Therefore, the noise may be eliminated when the above switching is made in the absence of the high-frequency bias or erasing current. The present invention is based upon this observed fact and will be described in more detail with reference to FIGS. 4 – 8.

Figure 4:
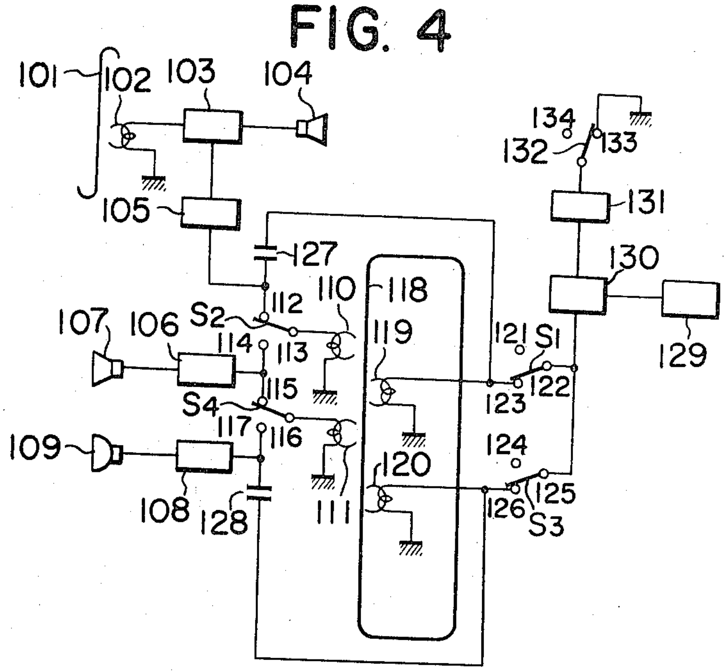
FIG. 4 is a block diagram of a magnetic recording-reproducing device especially adapted for learning the languages and embodying the present invention.

Referring to FIG. 4 the components from 101 to 129 shown in FIG. 4 correspond to the components 1 to 29 in FIG. 1 and thus they will not be described as they have been described in detail with reference to FIG. 1.

Reference numeral 130 designates a switching circuit for interrupting the high-frequency output signals from the bias generator 129;131, a monostable multivibrator (delay circuit) connected to the switching circuit 130 for feeding the output to it: 132, a switch which is switched to the contact 134 from the contact 133 before the contact 122 or 113 is disconnected from the contact 123 or 112, that is when the switches S2 and S1 are switched from recording to reproducing functions. The trigger signals generated by the switch 132 are applied to the monostable multivibrator in such a manner that it may recover to its stable state later than the time when the contact 122 is completely switched from the contact 123 to the contact 121 or the contact 113 is completely switched from the contact 112 to the contact 114.

Figure 5:
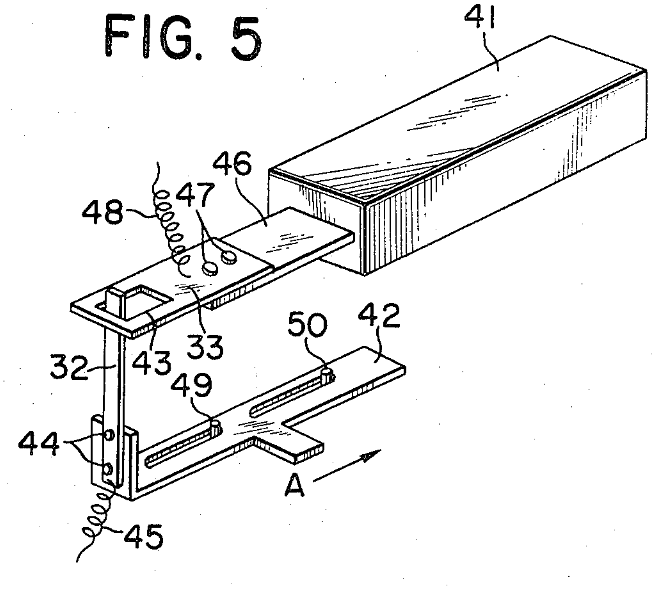
FIG. 5 is a perspective view of a recording-reproducing mode selection switch.

The contact 132, monostable multivibrator 131 and switching circuit 130 will be described in more detail hereinafter: Referring first to FIG. 5 illustrating one embodiment of the contact 32 which corresponds to the contact 132 in FIG. 4, the contact 32 is fitted into a rectangular aperture 43 formed through a contact plate 33 which is securely fixed to an actuating arm 46 in a switch box 41. The switches S1 and S2 are incorporated in this switch box 41 and switched to either recording or reproducing mode by the actuating arm 46. The contact plate 33 is grounded through a lead wire 48. The contact 32 cooperates with an operation member shown in FIG. 5 and is securely fixed to the upright portion of a slide plate 42 by means of pins 44. The slide plate 42 is guided by guide pins 49 and 50. The contact 32 is connected to the monostable multivibrator 131 through a lead wire 45. To switch from the recording mode to the reproducing mode, a selection lever (not shown) is shifted to "AUTO" position and in response to this movement the slide 42 is moved in the direction indicated by the arrow A so that the contact 32 is moved away from the contact 33. Thereafter the actuating arm 46 is pushed so that the switches S1 and S2 in the switch box 41 are actuated.

To switch from the reproducing mode to the recording mode, the selection lever is shifted to "Recording mode" position so that the slide 42 is moved in the direction opposite to that indicated by the arrow A. Therefore, the contact 32 moves in the aperture 43 and then pulls the arm so that the switches S1 and S2 in the switch box 41 are switched to the reproducing mode positions. Clearly, whenever the switches S2 and S1 are switched to the reproducing mode from the recording mode or vice versa, the contact 32 is moved away from the grounding contact 33.

Figure 6:
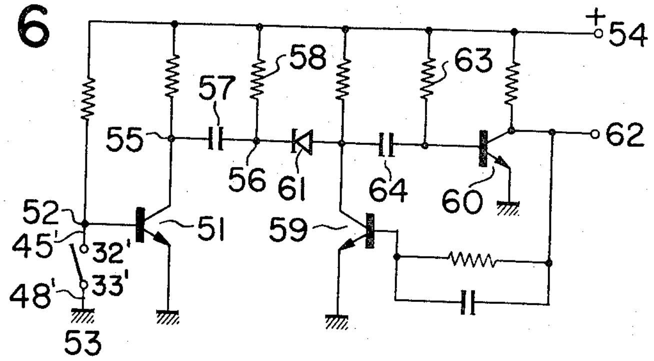
FIG. 6 is a circuit diagram of a monostable multivibrator used in the device of FIG. 4.

Referring FIG. 6, an n-p-n transistor 51 has its base connected to the contact 32' which corresponds to the contact 32 in FIG. 5. The positive bias voltages are fed to the base and collector from a DC power source 54 while the emitter is grounded. Therefore, when the contact 33' which corresponds to 33 in FIG. 5 is not in contact with the contact 32' so that the base potential of the transistor 51 is not dropped, so it is conductive, while when the contact 33' makes contact with the contact 32', it is rendered non-conductive. The collector 55 of the transistor 51 is connected to that of a n-p-n transistor 59 through a capacitor 57 and diode 61. A resistor 58 is connected to the junction between the capacitor 57 and the diode 61, and the capacitor 57 and registor 58 constitute a well known differentiation circuit. The diode 61 is connected to the base of a n-p-n transistor 60 through a capacitor 64 and the base is connected to the DC source 54 through a resistor 63. The resistor 63 and the capacitor 64 constitute a time-constant circuit, whose time constant is so selected as to be longer than a time required for completely switching the switches S1 – S4. The transistors 59 and 60 constitute a well known monostable multivibrator. The collector of the transistor 60 is connected to an output terminal 62.

As has been discussed hereinabove, the contact 33′ is disconnected from the contact 32′ when the switches S1-S4 in the switch box 41 are switched by the slide 42 so that the positive potential is fed to the base of the transistor 51 from the power source 54. Therefore the transistor 51 is conductive so that the collector voltage of the transistor 51 is dropped substantially to the grounding potential and this voltage drop or variation may be differentiated by the differentiation circuit consisting of the capacitor 57 and the resistor 58. Of the positive and negative differentiated pulses, the negative pulses are fed into the base of the transistor 60 and the diode 61. Therefore, the transistor 60 is rendered non-conductive so that the collector potential suddenly jumps from the near-grounding potential to that of the power source 54. On the other hand, the transistor 59 is rendered conductive so that the capacitor 64 is discharged through the resistor 63. In this instant, the base of the transistor 60 is applied with a potential negative relative to the grounding potential in order to keep the transistor 60 in non-conductive state. When the capacitor 64 is discharged, the voltage at the base of the transistor 60 drops to a voltage that is the grounding potential at which the transistor 60 is rendered conductive.

Whenever the slide 42 is moved by the selection lever to switch either to recording or reproducing mode, the monostable multivibrator is actuated so that its output voltage jumps from the near-grounding potential to the voltage of the DC source. The monostable multivibrator remains in this condition for a predetermined time and then the output voltage drops to the near-grounding potential. The collector output of the transistor 60 fed to the base of a transistor 70 ( See FIG. 7 ) in the switching circuit 130 connected to the high-frequency oscillator 129. The emitter of the p-n-p transistor 70 is connected to the center tap of the primary of an output transformer T and the base is applied with a positive bias voltage from the power source 54′ so that the transistor 70 is normally conducting. The transistors 71 and 72 and the transformer T constitute a well known push-pull amplifier. The primaries of an oscillation coil 73 are in back coupling relation with each other and are connected to the base and collector of a n-p-n transistor 74 while the secondary is connected to the bases of the transistors 71 and 72. The oscillation coil 73 and the transistor 74 constitute a well known high frequency oscillator. As seen from FIG. 7, the secondary of the output transformer T is connected to the heads 119′, 110′, 120′ and 111′ which correspond to the respective heads 19, 10, 20 and 11 shown in FIG. 4 through the switches S1 – S4 so that the high frequency current generated in the oscillator 129, that is the in the secondary of the transformer T is fed to them.

Figures 7, 8:
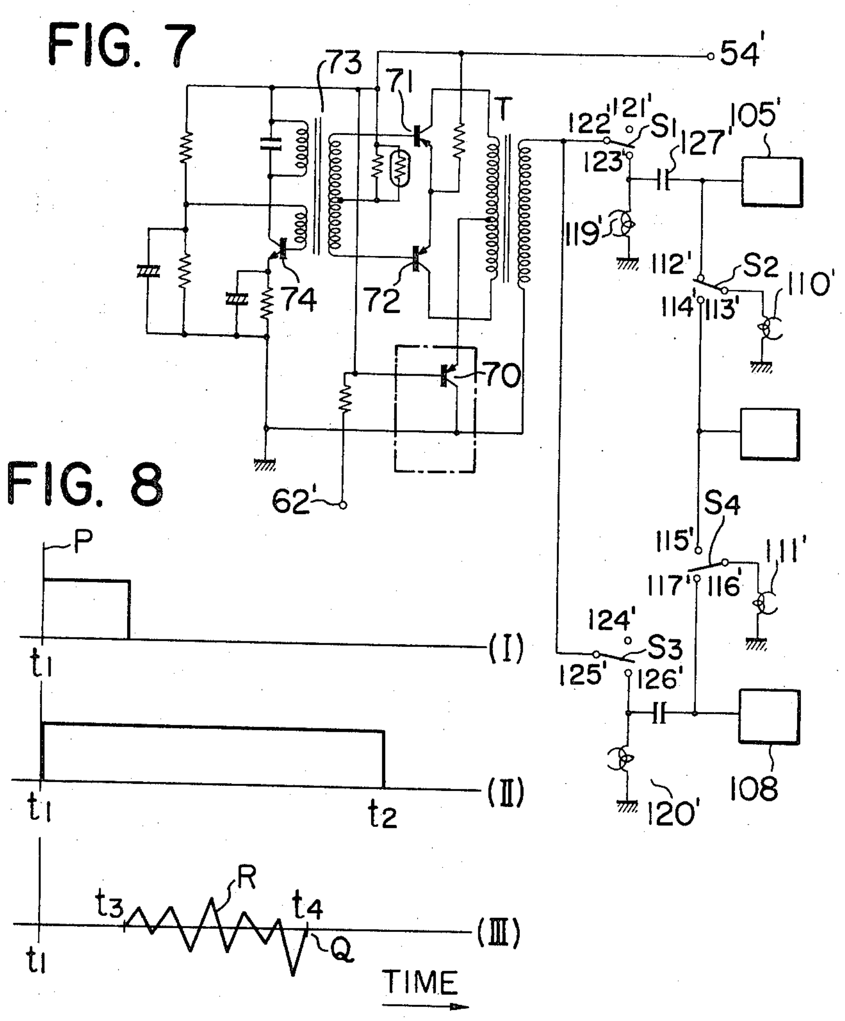
FIG. 7 is a circuit diagram of a high-frequency oscillator used in the device shown in FIG. 4.
FIG. 8 is a graph illustrating the time relationship of the functions of the circuit shown in FIG. 4.

. Next the mode of operation will be described. When the selection lever is shifted to the reproducing mode position, the slide 42 is moved in the direction indicated by the arrow A in FIG. 5 so that the contact 32 is disconnected from the contact 33, as shown in FIG. 5. In consequence, the transistor 51 in the monostable multivibrator 131 is rendered conductive so that the transistor 60 is rendered non-conductive for a time duration predetermined by the time constant of the resistor 63 and the capacitor 64 in FIG. 6. The collector potential of the transistor 60 jumps to the potential of the power source as soon as the slide 42 is moved and this potential remains for a predetermined time duration. Since the collector output terminal of the transistor 60 is connected to the base of the transistor 70 ( See FIG. 7 ) in the switching circuit 130 shown in FIG. 4, the transistor 70 is rendered non-conductive. Therefore, the high frequency output signals from the secondary of the transformer T in the high-frequency oscillator are interrupted. Thereafter, the contact 32 of the slide 42 pushes the arm 46 in the direction indicated by the arrow A so that the switches S1 and S2 in the switch box 41 are switched. That is the contacts 122′ and 113′ are switched to the contacts 121′ and 114′ from the contacts 123′ and 112′ ( See FIG. 7 ). When switches S1 and S2 are being switched, the high-frequency oscillator 129 is disconnected by the switching circuit 130 so that no high-frequency bias is applied to the switches S1 and S2. That is, at the time $t_1$ in FIG. 8 when the recording mode is switched to the reproducing mode or vice versa, the switching circuit 130 is actuated by the monostable multivibrator 131 for a time duration from $t_1$ and $t_2$ so that no high-frequency current is applied to the switches S1 and S2 during this time. The slide 42 is further moved so that the switches S1 and S2 are actuated in a time duration between $t_3$ and $t_4$. That is, the movable contact moves away from one fixed contact at $t_3$ and is connected to the other fixed contact at $t_4$. During this time, the noise is produced as shown in FIG. 8-III because of the non-uniform contact between the movable and fixed contacts. As has been pointed out above, the high frequency current is interrupted during this time so that no high frequency current is superposed upon the noise and fed to the heads 110 and 119 or 110′ and 119′. Thus, there is no fear that the noise as shown in FIG. 8-III is recorded on the tape 18.

When the switches S1 and S2 are switched, the signals upon the magnetic tape 101 are transferred to the tape 118 through the head 102, the amplifiers 103 and 105 and the recording-reproducing head 110. The transferred signals may be reproduced through the head 110, the amplifier 106 and the loudspeaker 107. To switch to the recording mode, the selection lever is shifted to the recording position so that the slide 42 is moved in the opposite direction. Therefore the contact 32 is first moved in the aperture 43 leaving from the contact 33 as seen from FIG. 5. Therefore, the monostable multivibrator 131 interrupts the switching circuit 130 for a predetermined time in a manner described hereinabove, thereby interrupting the high frequency output from the high frequency oscillator 129. At time 4 in FIG. 8-III, the contacts 122 and 113 completely make contact with the contacts 123 and 112 and then the switching circuit 130 is released from the interruption mode so that the high frequency current from the oscillator 129 is applied to the heads 110 and 119. The signals recorded on the magnetic tape 101 are reproduced and printed on the tape 118 through the head 102, the amplifiers 103 and 105 and the switch S2 together with the high-frequency bias from the oscillator 129. Since the high-level, high-frequency signals are interrupted prior to the time the recording mode is switched to the reproducing mode or vice versa, the noise produced due to the non-uniform contact between the moving and fixed contacts of the switches are not recorded upon the tape. Therefore, no noise is reproduced.

In the instant embodiment, the switches S3 and S4 are similar to the switches S1 and S2 so that they are not described in detail. The switches S3 and S4 are switched independently of the switches S1 and S2. For example, when a student wants to record his pronunciation in the lower track of the tape 118 or when he wants to reproduce it, a slide similar to the slide 42 may be provided so that it may actuate an actuating arm which in turn actuates the switches S3 and S4 in response to the shifting of the mode selection lever.

In the instant embodiment, the monostable multivibrator is employed in order to start the switching circuit before the mode switching operation is started and to hold it until the mode switching operation is completely accomplished, but any other suitable time-delay element may be utilized in a time-delay circuit. The switching circuit 131 has been shown as being connected to the output transformer of the high frequency oscillator, but it may be connected to an output circuit in the high-frequency oscillator or to a power supply circuit for the oscillator so as to forcibly interrupt the oscillator. It is not necessary to connect the delay circuit 131 to be switching circuit 130. The switch 132 may directly control the switching circuit 130. More particularly, the switch 132 is opened in response to the actuation of the switches S1 and S2 or S3 and S4 so that the switching circuit 130 is turned OFF so as to interrupt the output from the oscillator. Thus, the high frequency signals are not applied to the contacts when the switches S1 and S2 or S3 and S4 are switched. In this case, this operation is not accomplished by the switch as shown in FIG. 5 so that the switch 132 must be so arranged as to be actuated independently of the switches S1 – S4 in such a manner that after the switch 132 is moved toward 134, the switches S1 and S2 or S3 and S4 are actuated and then the switch 132 is returned to 133.

According to the present invention prior to the recording-reproducing mode switching or interruption of the erase head the high frequency current is interrupted and after the mode switching has been completely accomplished, the high frequency current is supplied again so that the noise produced when the mode switching is made or the noise produced because the distorted high frequency current is superposed may be prevented from being recorded at high level. The present invention provides a switching circuit which is especially effective for a magnetic recording-reproducing system in which a magnetic tape is constantly in contact with a magnetic head.

What is claimed is:

1. A magnetic recording-reproducing device having a magnetic recording medium upon which is recorded the information, an erase head and a recording and reproducing head, comprising;

a high frequency signal generating circuit electrically coupled to said head for generating high frequency signals for bias and erasing current, the frequency of which signals is higher than a frequency range of the information signals;

a switching circuit electrically coupled between said high frequency generating circuit and the erase and recording-reproducing heads for interrupting the output of said high frequency signal generating circuit;

an information signal source electrically coupled to said head for producing an electrical signal to be recorded on said medium; recording and reproducing mode selection switches having a first switch and a second switch which are turned over simultaneously, the first switch being electrically connected between said erase head and said switching circuit, and the second switch being electrically connected between said recording head and said information signal source, said erase head and said recording and reproducing head being juxtaposed each other in the direction of transfer of the recording medium;

time delay circuit means operatively connnected to said switching circuit and having a trigger to turn-off and to delay to turn-on the switch circuit, said time delay circuit means having a trigger actuating member associated operatively with said mode selection switches in a timed relation so as to trigger said delay circuit before the turn-over of said mode selection switches, the delay time being so selected that said delay circuit interrupts said switching circuit prior to the switching of said first and second switches whereby when said first and second switches are being switched, no high frequency signals at high level are applied to said erase and recording-reproducing heads, thereby preventing the noise due to said high frequency signals from being recorded on said magnetic recording medium.

2. A magnetic recording-reproducing device as defined in claim 1 wherein said time delay circuit has a second switching means which are actuated prior to the actuation of said first and second switches.

3. A magnetic recording-reproducing device as defined in claim 2 wherein said switching means comprises an electronic switch employing semiconductive elements;

said delay circuit comprises a monostable multivibrator which is triggered by said second switching means which in turn is actuated prior to the switching of said mode selection switches, the time constant which determines a reset time of said monostable multivibrator being slightly longer than a time interval required for switching of said mode selection switches.

4. A magnetic recording-reproducing device as defined in claim 2 wherein said second switching means is a mechanical switch whose contacts are closed and opened by a switch actuating member which in turn is actuated in unison with an operating member; said mode selection switches have a switch actuating member, said second switch actuating member engages with said mode selection switch actuating member so as to be driven after said second switching means is activated by said operating member, thereby switching said mode selection switches.

5. A switching noise diminishing device for a magnetic recording and reproducing apparatus including at least one magnetic conversion head for recording signals upon magnetic recording medium and reproducing said signals, comprising;

means electrically coupled to said head for generating high frequency bias signals whose frequency is higher than the frequency range of the signals to be recorded upon said magnetic recording medium;

switching means electrically coupled between said generating means and the magnetic conversion head for interrupting the output of said high frequency bias signal to the head, said switching means having a turn-over actuating member;

an information signal source electrically coupled to said head for producing an electrical signal to be recorded on said medium;

recording and reproducing mode selection switches different from said switching means and having a first switch and a second switch which are turned over simultaneously, the first switch being electrically connected between said head and said switching means, and the second switch being electrically connected between said head and said information signal source, the mode selection switches being arranged to disconnect the bias signal from said head when its reproducing mode is selected;

said mode selection switches being operative-engageably connected with said actuating member of said switching means for turn-over in sequentially delayed timed relation;

whereby the high level, high frequency bias signals applied to said magnetic conversion head are interrupted while said selection switches are being switched, thereby preventing the noise due to turn-over of said mode selection switches from being recorded.

6. A switching noise diminishing device for a magnetic recording and reproducing apparatus including at least one magnetic conversion head for recording signals upon magnetic recording medium and reproducing said signals, comprising;

means electrically coupled to said head for generating high frequency bias signal whose frequency is higher than the frequency range of signals to be recorded upon said magnetic recording medium;

switching means electrically coupled between said generating means and the magnetic conversion head for interrupting the output of said high frequency bias signal to the head;

an information signal source electrically coupled to said head for producing an electrical signal to be recorded on said medium;

recording and reproducing mode selection switches different from said switching means and having a first switch and a second switch which are turned over simultaneously, the first switch being electrically connected between said head and said switching means, and the second switch being electrically connected between said head and said information signal source, the mode selection switches being arranged to disconnect the bias signal from said head when its reproducing mode is selected;

delay means associated with said switching means to turn-off and delay its turn-on, said delay means have a trigger switching means for starting the delay operation and having a predetermined time delay in which said mode selection switches are turned-over, the trigger switching means being operatively connected with said mode selection switches in sequentially delay timed relation, whereby the high level frequency bias signals applied to said magnetic conversion head are interrupted while said selection switches are being switched, thereby preventing the noise due to turn-over of said mode selection switches from being recorded.

7. A switching noise diminishing device as defined in claim 6, wherein said switching means has a switch actuating member for activating the trigger switching means and mode selection switches in a timed relation and, said switching means and trigger switching means are simultaneously actuated prior to the switching of said mode selection switches by operating said actuating member.

8. A switching noise diminishing device as defined in claim 6 wherein said switching means comprises an electronic switch employing semiconductive elements;

said delay means comprises a monostable multivibrator which is triggered by said trigger switching means which in turn is actuated prior to the switching of said mode selection switches, the time constant which determines a reset time of said monostable multivibrator being slightly longer than a time interval required fro the switching of said mode selection switches.

9. A switching noise diminishing device as defined in claim 6 wherein said trigger switching means is a mechanical switch whose contacts are closed and opened by functions; switch actuating member which in turn is actuated in unison with an operating member, said mode selection switches have a switch actuating member, said trigger switch actuating member engages with said mode selection switch actuating member so as to be driven after said trigger switching means is activated by said operating member, thereby switching said mode selection switches.

10. A noise diminishing device as defined in claim 6 wherein said magnetic conversion head comprises a magnetic head having both of the erasing and recording fucntions; the high frequency signals are applied from said high frequency signal generating means to said magnetic head in case of recording and the signals to be recorded are superposed upon the high frequency signals.

* * * * *